United States Patent
Hong et al.

(10) Patent No.: US 12,278,884 B2
(45) Date of Patent: Apr. 15, 2025

(54) APPARATUS AND METHOD FOR DESCRIPTOR HANDLING IN SOFTWARE AND HARDWARE INTERWORKING SYSTEMS AND COMPUTER-READABLE MEDIUM

(71) Applicant: GREATER SHINE LIMITED, New Taipei (TW)

(72) Inventors: Hausting Hong, San Diego, CA (US); Su-Lin Low, San Diego, CA (US)

(73) Assignee: GREATER SHINE LIMITED, New Taipei (TW)

( * ) Notice: Subject to any disclaimer, the term of this patent is extended or adjusted under 35 U.S.C. 154(b) by 416 days.

(21) Appl. No.: 17/813,594

(22) Filed: Jul. 19, 2022

(65) Prior Publication Data
US 2022/0360650 A1 Nov. 10, 2022

Related U.S. Application Data

(63) Continuation of application No. PCT/IB2020/058304, filed on Sep. 7, 2020.

(60) Provisional application No. 62/964,058, filed on Jan. 21, 2020.

(51) Int. Cl.
| | |
|---|---|
| *H04L 69/321* | (2022.01) |
| *G06F 15/173* | (2006.01) |
| *H04L 69/324* | (2022.01) |

(52) U.S. Cl.
CPC .......... *H04L 69/321* (2013.01); *H04L 69/324* (2013.01)

(58) Field of Classification Search
CPC .. H04L 69/321; H04L 69/324; G06F 15/1735
See application file for complete search history.

(56) References Cited

U.S. PATENT DOCUMENTS

| | | | |
|---|---|---|---|
| 2006/0215656 A1* | 9/2006 | Shirogane | H04L 47/323 370/389 |
| 2009/0150563 A1* | 6/2009 | Piekarski | H04L 49/35 709/238 |
| 2016/0182692 A1* | 6/2016 | Snyder, II | H04L 69/22 370/392 |

(Continued)

FOREIGN PATENT DOCUMENTS

| | | |
|---|---|---|
| CN | 102065568 | 5/2011 |
| EP | 0752651 | 1/1997 |

OTHER PUBLICATIONS

WIPO, International Search Report and Written Opinion for International Application No. PCT/IB2020/058304, Feb. 17, 2021.

(Continued)

*Primary Examiner* — Harry H Kim
(74) *Attorney, Agent, or Firm* — Hodgson Russ LLP

(57) ABSTRACT

Apparatuses and methods for command and response descriptors handling are provided. In an example, a method for descriptor handling can include instantiating a command descriptor of a command regarding a packet at a first layer of a protocol stack by a microcontroller of a node. The method can also include passing a command pointer to the command descriptor to integrated circuits of the node from the microcontroller of the node. The method can further include looking up, by the integrated circuits, the command descriptor. The method can additionally include processing the command by the integrated circuits.

16 Claims, 7 Drawing Sheets

(56) References Cited

U.S. PATENT DOCUMENTS

| | | | | |
|---|---|---|---|---|
| 2016/0301613 A1* | 10/2016 | Boucher | ............... | H04L 47/10 |
| 2017/0139873 A1* | 5/2017 | Feehrer | ............... | G06F 9/455 |
| 2021/0105690 A1* | 4/2021 | Wu | ............... | H04W 24/08 |
| 2023/0034839 A1* | 2/2023 | Passon | ............... | G09G 5/395 |
| 2023/0040655 A1* | 2/2023 | Snyder, II | ............... | H04L 69/22 |

OTHER PUBLICATIONS

CNIPA, First Office Action for CN Application No. 202080093709.4, Sep. 30, 2024.

* cited by examiner

APPARATUS AND METHOD FOR DESCRIPTOR HANDLING IN SOFTWARE AND HARDWARE INTERWORKING SYSTEMS AND COMPUTER-READABLE MEDIUM

CROSS-REFERENCE TO RELATED APPLICATION

This application is a continuation of International Application No. PCT/M2020/058304, filed Sep. 7, 2020, which claims priority to U.S. Provisional Application No. 62/964,058, filed Jan. 21, 2020, the entire disclosures of which are incorporated herein by reference.

TECHNICAL FIELD

Embodiments of the present disclosure relate to an apparatus and method for descriptor handling and a computer-readable medium, which may be applicable to communication systems, such as wireless communication systems.

BACKGROUND

Communication systems, such as wireless communication systems, are widely deployed to provide various telecommunication services such as telephony, video, data, messaging, and broadcasts. When packets are received through a medium, for example, over the air in the case of wireless communication, a radio frequency (RF) module may convert radio waves to bits. These bits may be initially processed by a physical layer and subsequently passed up a protocol stack. Likewise, bits for transmission may be provided to the top of the protocol stack, and subsequently packaged for transmission by the physical layer.

Multiple data structures are created, with each data structure being tailored to a particular protocol layer of the protocol stack. This data structure is instantiated at runtime, distributed all over the memory and physically placed in a queue as—is, to facilitate hardware/software interworking. This approach uses memory in a size that depends on the size of the bit grouping, for example, code block, protocol data unit, service data unit, packet, and so on.

SUMMARY

In one example, an apparatus for descriptor handling may include a microcontroller configured to instantiate a command descriptor of a command regarding a packet at a first layer of a protocol stack. The microcontroller can also be configured to pass a command pointer to the command descriptor to integrated circuits of the apparatus. The integrated circuits can be configured to look up the command descriptor. The integrated circuits can additionally be configured to process the command.

In another example, a method for descriptor handling can include instantiating a command descriptor of a command regarding a packet at a first layer of a protocol stack by a microcontroller of a node. The method can also include passing a command pointer to the command descriptor to integrated circuits of the node from the microcontroller of the node. The method can further include looking up the command descriptor by the integrated circuits. The method can additionally include processing the command by the integrated circuits.

In yet another example, a non-transitory computer-readable medium may encode instructions that, when executed by a microcontroller of a node, perform a process for descriptor handling. The process may include instantiating a command descriptor of a command regarding a packet at a first layer of a protocol stack by the microcontroller. The process may also include passing a command pointer to the command descriptor to integrated circuits of the node from the microcontroller. The command descriptor may be configured to permit looking up the command by the integrated circuits. The command descriptor may be configured to additionally permit processing the command by the integrated circuits.

BRIEF DESCRIPTION OF THE DRAWINGS

The accompanying drawings, which are incorporated herein and form a part of the specification, illustrate embodiments of the present disclosure and, together with the description, further serve to explain the principles of the present disclosure and to enable a person skilled in the pertinent art to make and use the present disclosure.

DETAILED DESCRIPTION

Figure 1:
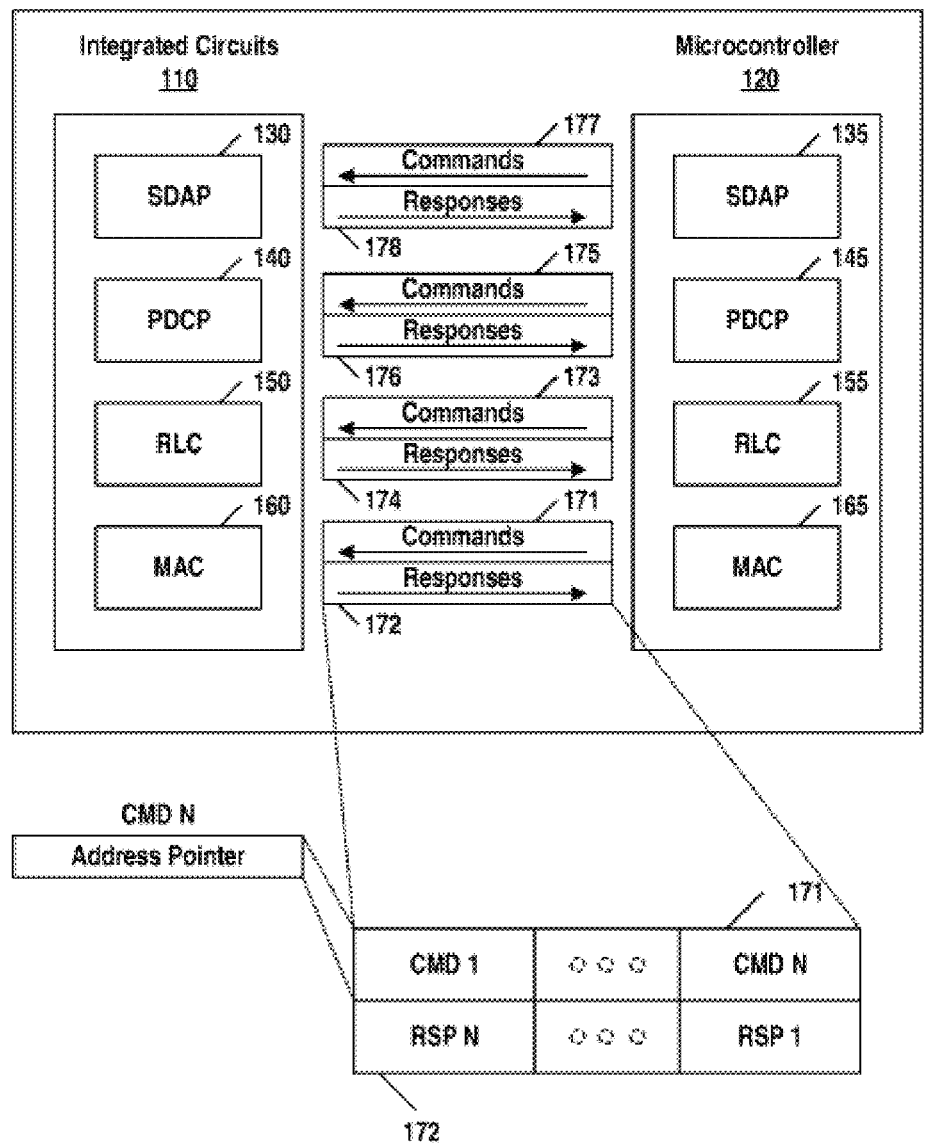
FIG. 1 illustrates a system for descriptor handling according to some embodiments of the present disclosure.

Although specific configurations and arrangements are discussed, it should be understood that this is done for illustrative purposes only. A person skilled in the pertinent art will recognize that other configurations and arrangements can be used without departing from the spirit and scope of the present disclosure. It will be apparent to a person skilled in the pertinent art that the present disclosure can also be employed in a variety of other applications.

It is noted that references in the specification to "one embodiment," "an embodiment," "an example embodiment," "some embodiments," etc., indicate that the embodiment described may include a particular feature, structure, or characteristic, but every embodiment may not necessarily include the particular feature, structure, or characteristic. Moreover, such phrases do not necessarily refer to the same embodiment. Further, when a particular feature, structure, or characteristic is described in connection with an embodiment, it would be within the knowledge of a person skilled in the pertinent art to effect such feature, structure, or characteristic in connection with other embodiments whether or not explicitly described.

In general, terminology may be understood at least in part from usage in context. For example, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Various aspects of wireless communication systems will now be described with reference to various apparatus and methods. These apparatus and methods will be described in the following detailed description and illustrated in the accompanying drawings by various blocks, modules, units, components, circuits, steps, operations, processes, algorithms, etc. (collectively referred to as "elements"). These elements may be implemented using electronic hardware, firmware, computer software, or any combination thereof. Whether such elements are implemented as hardware, firmware, or software depends upon the particular application and design constraints imposed on the overall system.

The techniques described herein may be used for various wireless communication networks, such as code division multiple access (CDMA) system, time division multiple access (TDMA) system, frequency division multiple access (FDMA) system, orthogonal frequency division multiple access (OFDMA) system, single-carrier frequency division multiple access (SC-FDMA) system, and other networks. The terms "network" and "system" are often used interchangeably. A CDMA network may implement a radio access technology (RAT) such as Universal Terrestrial Radio Access (UTRA), evolved UTRA (E-UTRA), CDMA 2000, etc. A TDMA network may implement a RAT such as GSM. An OFDMA network may implement a RAT, such as long term evolution (LTE) or new radio (NR). The techniques and system described herein may be used for the wireless networks and RATs mentioned above, as well as other wireless networks and RATs. Likewise, the techniques and systems described herein may also be applied to wired networks, such as networks based on optical fibers, coaxial cables, or twisted-pairs, or to satellite networks.

Some embodiments of the present disclosure relate to a mechanism to use a monolithic, centralized data structure in the memory as a basic unit to describe the status and include commands of a protocol data unit (PDU), sometimes also referred to as a packet, that traverses up and down vertically through protocol layers. This data structure may be referenced by a pointer at runtime to allow interworking between software and hardware. A block of such pointers in a consecutive memory location can also facilitate highly automated processes in both software and hardware.

Some embodiments may have various benefits and/or advantage as to various technical aspects. For example, some embodiments may enhance hardware efficiency. Instead of implementing four templates to accommodate four protocol layers—medium access control (MAC), radio link control (RLC), packet data convergence protocol (PDCP), and service data adaptation protocol (SDAP)— a single universal packet descriptor can be used. Likewise, some embodiments obviate the need for an additional tracking module to track the location of a PDU in the stack, so that a right template of the four templates can be applied. In some embodiments, a single common template can be used. The active hardware module can simply access the desired entry. In this way, there may be no confusion, no ambiguity, no chance of mistakes, nor any cross-checking.

Additionally, some embodiments may save memory space. In a case where there are four protocol layers and four templates, there may be common fields among those four protocol layers. Duplication may result from those common fields across the templates. Thus, some embodiments may avoid unnecessary memory space to store and move those duplicated fields. For example, one data structure, as opposed to four data structures with many shared fields, may result in less memory usage. If a saving of forty bytes on a single PDU can be achieved, twenty-thousand PDUs would result in 800 kilobytes (KB) of memory saving. In some embodiments, there may be only one data structure that consolidates the necessary information fields needed by four or more protocol layers. There is, thus, no movement required for the data structure. Instead, pointers can be used to direct control to access data. In this way, less memory space may be consumed, and less memory movement may result. Less memory space may lead to lower-cost implementations, while less memory movement may lead to lower power consumption, which may result in a longer talk time in the device.

Some embodiments may also provide benefits for software efficiency. As with hardware, there may be a counterpart of those four types of data structures declared and used throughout the protocol stack in approaches lacking a universal packet descriptor. The use of a single universal packet descriptor may provide clean and simple software implementation. For example, there may be only one structure and one storage to look up. The simplicity may also add advantages to data tracking, profiling throughput, and/or characterizing traffic flow.

Some embodiments may also provide memory space benefits with respect to the software. Simplicity in design can directly translate to saving code space. Some embodiments drastically reduce the size of memory in code. The memory space reduction may lead to a cost reduction.

Some embodiments may also provide scalability benefits. The one centralized descriptor scheme may make scalability much greater than a multiple descriptor scheme. More information elements can be padded to the end of a data structure without change of hardware, and yet all modules in the software protocol stack may have access to those additional fields. Change of hardware register definition may require a change of hardware, as well. Thus, some embodiments may reduce the need for hardware upgrades.

Some embodiments may provide a variety of efficiency benefits. Single bookkeeping to track usage of descriptors may make it easy to manage memory. Less memory copying may also mean fewer bus cycles and less power consumption. Less power consumption may lead to longer talk time and/or high-throughput, massive data streaming in fifth-generation (5G) networks. Various applications may benefit from such a result, particularly in a power-limited device, such as a device powered by a battery.

Some embodiments may also provide benefits or advantages for development and debugging. One structure that fits multiple software protocol modules may lead to simplified coding and debugging. For example, a single macro at one spot in the code can be provided to profile a data packet on its activity and whereabout in the uplink or downlink when it comes to debugging. This may replace hundreds of lines of code to blanket all loose ends for the same purpose in software without a universal packet descriptor, and the hundreds of lines of code may still risk missing one or more action.

One aspect of some embodiments is a universal packet descriptor. The universal packet descriptor can include such as aspects as to the location, status, size, behavior, and other attributes pertinent to a protocol under consideration at any instant in time. A single template or stencil universal packet descriptor can be applied in every case.

In the case of downlink processing in a user equipment (UE) or uplink processing in a base station (BS) or other access nodes, specific embodiments of the universal packet descriptor may be instantiated from a pool of onboard memory upon decoding a data packet from the MAC layer. The descriptor may be released at the top of PDCP layer. Thus, the lifetime of the descriptor may be the time it takes to process the corresponding decoded data through the entire protocol stack. One universal packet descriptor per-protocol data unit can be employed, as the MAC PDU may be a useful processing portion at the MAC layer and above.

There may be various aspects to the interworking of hardware and software according to some embodiments. For example, command/response queues may provide uni-directional communication. These queues may function as first-in-first-out (FIFO) and may be paired to facilitate two-way communication between hardware and software in each protocol layer. Commands may be entered into a queue from software to configure or instruct how the hardware should work. Vice versa, responses may be fed into another queue from the hardware to indicate status or response to any given command.

There may be no need for a delay in either hardware or software. The sending party may simply pump action items into the queue, and the receiving party may pick up the tickets from the queue and execute them. The software can count on interrupts to bring it to life, and the hardware can use a clock, or the completion of a previous task, to periodically check and see if there is anything in the queue.

Commands and responses may be listed in the descriptor table pointed by a pointer instantiated from the sending party. This pointer may then be inserted into the end of the queue so that it can be served at the other end. Thus, the queues may just include pointers, as opposed to the actual descriptor table.

There may be various ways to embody these various aspects. For example, some embodiments may be implemented as a system on chip (SoC). SoCs can include a microcontroller, a central processing unit (CPU), a CPU cache, a graphics processing unit (GPU), and other processing and memory elements. The SoC may include a camera image signal processor (ISP), a digital signal processor (DSP), as well as interfaces to on-chip and off-chip memory. The SoC may be broadly divided into a multicore subsystem, a multimedia subsystem, and a modem subsystem. Each of these subsystems may be connected through a system fabric and may have access to memory, such as a dual-channel memory.

The modem subsystem may be an integrated multimode modem. For example, the modem subsystem may be configured to operate in third-generation (3G), fourth-generation (4G), LTE, and fifth-generation (5G) communication systems. The modem subsystem may also be configured to operate using Bluetooth and WiFi. Furthermore, the modem subsystem may be configured to receive other terrestrial radio signals, such as frequency modulation (FM) and/or amplitude modulation (AM) radio signals, and positioning signals, for example, global positioning system (GPS), global navigation satellite system (GLONASS), Galileo, and/or Beidou. The modem subsystem may also be equipped for other communication methods, including satellite communications and near field communication (NFC). A DSP of the SoC may include multiple cores. For example, one or more DSP cores may be used by the multimedia subsystem, and one or more other DSP cores may be used by the modem subsystem.

Figure 5:
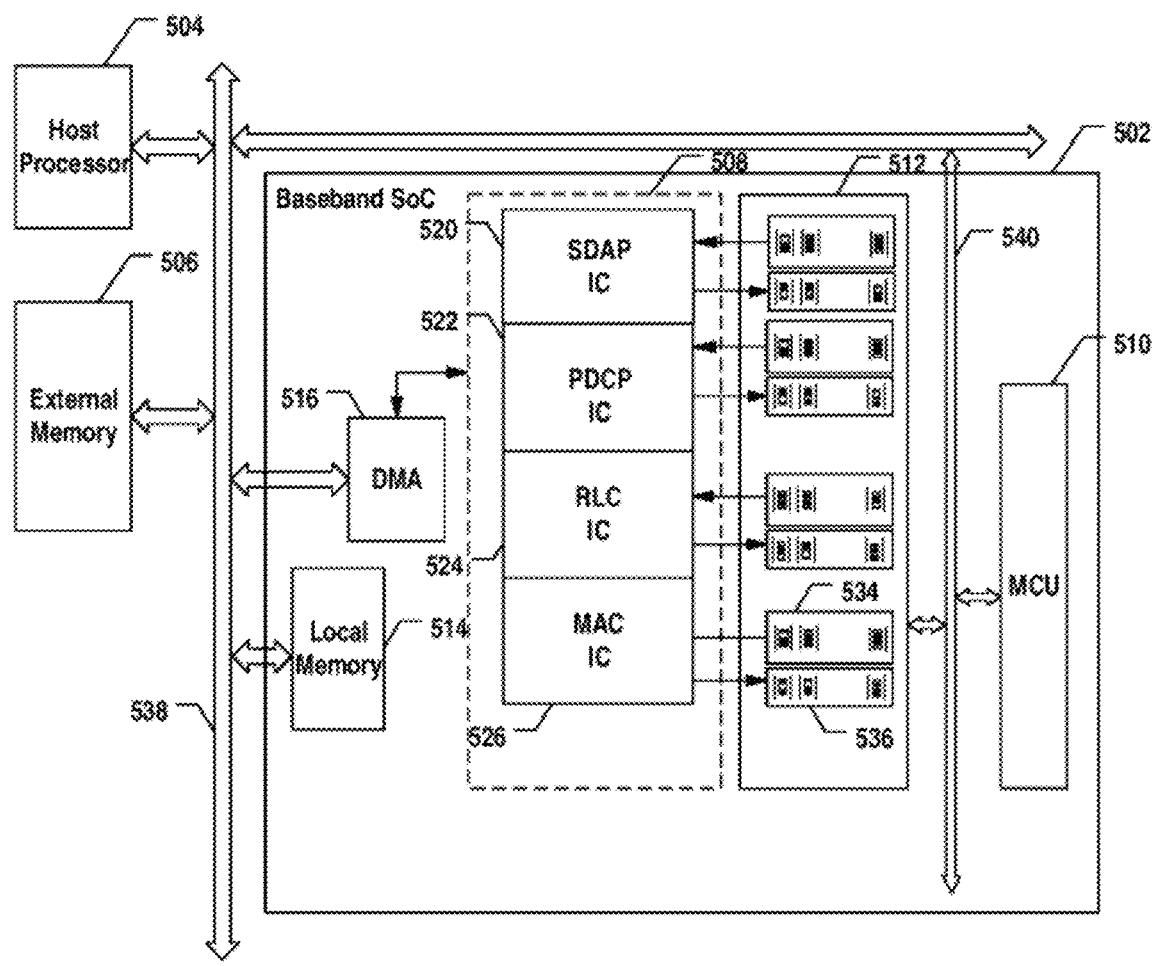
FIG. 5 illustrates a detailed block diagram of a baseband chip implementing packet processing using Layer 2 circuits and a microcontroller according to some embodiments of the present disclosure.

Some aspects of the explanation of some embodiments of the present disclosure discuss hardware aspects and software aspects. In some cases, the hardware aspects can refer to aspects that are performed by specialized hardware, such as a hardware-based protocol stack implementation. FIG. 5, discussed below, provides a specific example of a hardware-based protocol stack implementation with multiple dedicated integrated circuits, such as application-specific integrated circuits (ASICs), handling different layers of the protocol stack. On the other hand, the software aspects can refer to aspects that may be performed by a general-purpose processor or by a layer-independent specialized modem processor. FIG. 5 illustrates a specific example in which the software aspects may be implemented on a microcontroller.

FIG. 1 illustrates a software and hardware interworking system 100 for descriptor handling according to some embodiments of the present disclosure. As shown in FIG. 1, a system can involve an exchange of commands and responses between integrated circuits 110, which can also be referred to as hardware, and microcontroller 120, which can also be referred to as software. Integrated circuits 110 may include specialized circuitry that is exclusively for handling ingoing and/or outgoing packets. In some embodiments, software and hardware interworking system 100 may be implemented in whole or in part in a baseband SoC, which may be part of a larger SoC.

Integrated circuits 110 may include circuits or sub-circuits configured to handle one or more specific layers of a protocol stack. Each of these layer-specific circuits or sub-circuits may be referred to as hardware modules. For example, as shown in FIG. 1, integrated circuits 110 may include a hardware SDAP module 130, a hardware PDCP module 140, a hardware RLC module 150, and a hardware MAC module 160.

Similarly, microcontroller 120 may include functions implemented as software processes. Each of these functions may be configured to handle one or more specific layers of a protocol stack. As an example, software running on a general-purpose processor or a baseband processor may handle all the functions of microcontroller 120. Each of these software processes may be referred to as software modules. For example, as shown in FIG. 1, microcontroller 120 may include a software SDAP module 135, a software PDCP module 145, a software RLC module 155, and a software MAC module 165.

As shown in FIG. 1, microcontroller 120 may provide commands to integrated circuits 110. Likewise, integrated circuits 110 may provide responses to microcontroller 120. To provide these commands and responses, various queues can be used. For example, software MAC module 165 may provide commands using queue 171 and may receive responses from hardware MAC module 160 in queue 172. Similarly, queues 173 and 174 may be used respectively for commands and responses for an RLC layer, queues 175 and 176 may be used respectively for commands and responses for a PDCP layer, and queues 177 and 178 may be used respectively for commands and responses for an SDAP layer.

As shown in the enlarged portion at the bottom right of FIG. 1, queue 171 may include command (CMD) 1 through CMD N, which may be placed into queue 171 by software MAC module 165 and read from queue 171 by hardware MAC module 160 in the order in which they were enqueued. Likewise, queue 172 may include response (RSP) 1 through RSP N, which may be placed into queue 172 by hardware MAC module 160 and read from queue 172 by software MAC module 165 in the order in which they were enqueued.

As shown in the further enlarged portion at the bottom left of FIG. 1, CMD N may include an address pointer. In some embodiments, the CMD N may be only an address pointer. The address pointer may point to a location in memory containing a descriptor.

Figure 2:
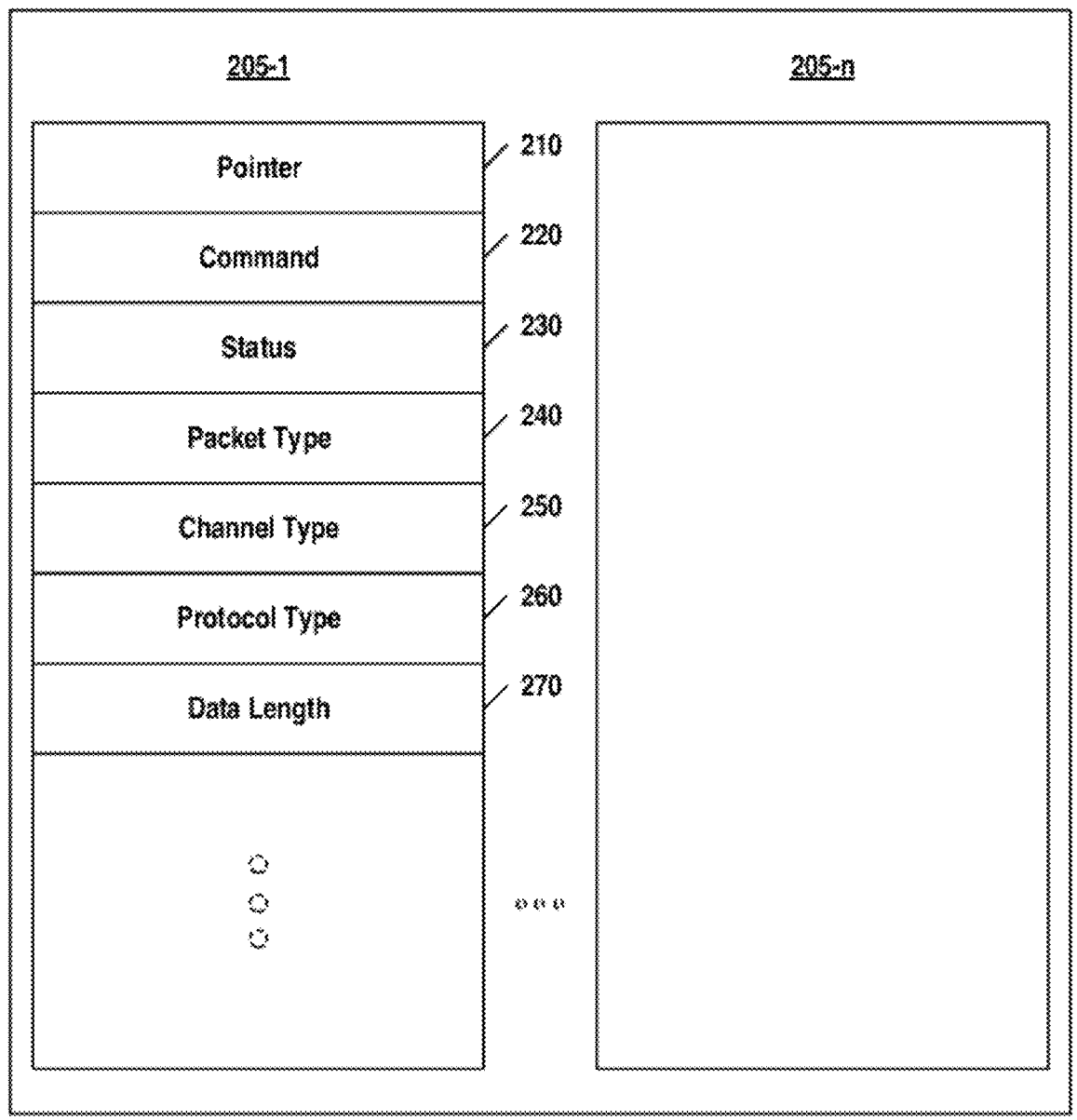
FIG. 2 illustrates a storage for descriptor maintenance according to some embodiments of the present disclosure.

FIG. 2 illustrates a storage 200 for descriptor storing according to some embodiments of the present disclosure. Storage 200 can include a plurality of descriptors 205-1 to 205-n. Each descriptor can include a variety of fields. A first field can be a pointer 210 to a given packet. In the case of downlink (DL) processing, this may be a packet received at a physical (PHY) layer. In the case of uplink (UL) processing, this may be a packet generated by a host or application of a user equipment (UE).

Each of descriptors 205-1 to 205-n can include a plurality of fields. The format of these fields can be designed to include enough fields for every layer of the protocol stack, such that the same descriptor can be re-used for each layer of the protocol stack. Each of the fields can have a static length in some embodiments. In other embodiments, each of the fields can have a dynamic length. Combinations of dynamic length and static length fields are also permitted. The overall descriptor length may be longer than would be needed for any one layer. On the other hand, many of the layers may use the same fields. The descriptor without the content of the fields may be viewed as a template. By including fields sufficient to serve every layer, a unified template may be capable of being used and re-used at every layer.

Fields of each descriptor may include a field for command 220, which may provide a command or response. For example, the software may populate this field with a command. The descriptor may also include a field for status 230. For example, the hardware may populate this field with a response to the command, such as "acknowledged" or "failed." Other fields may indicate details about the packet or its communication, such as packet type 240, channel type 250, protocol type 260, and data length 270. These are merely examples. Different fields and fewer or more fields may be used.

Figure 3:
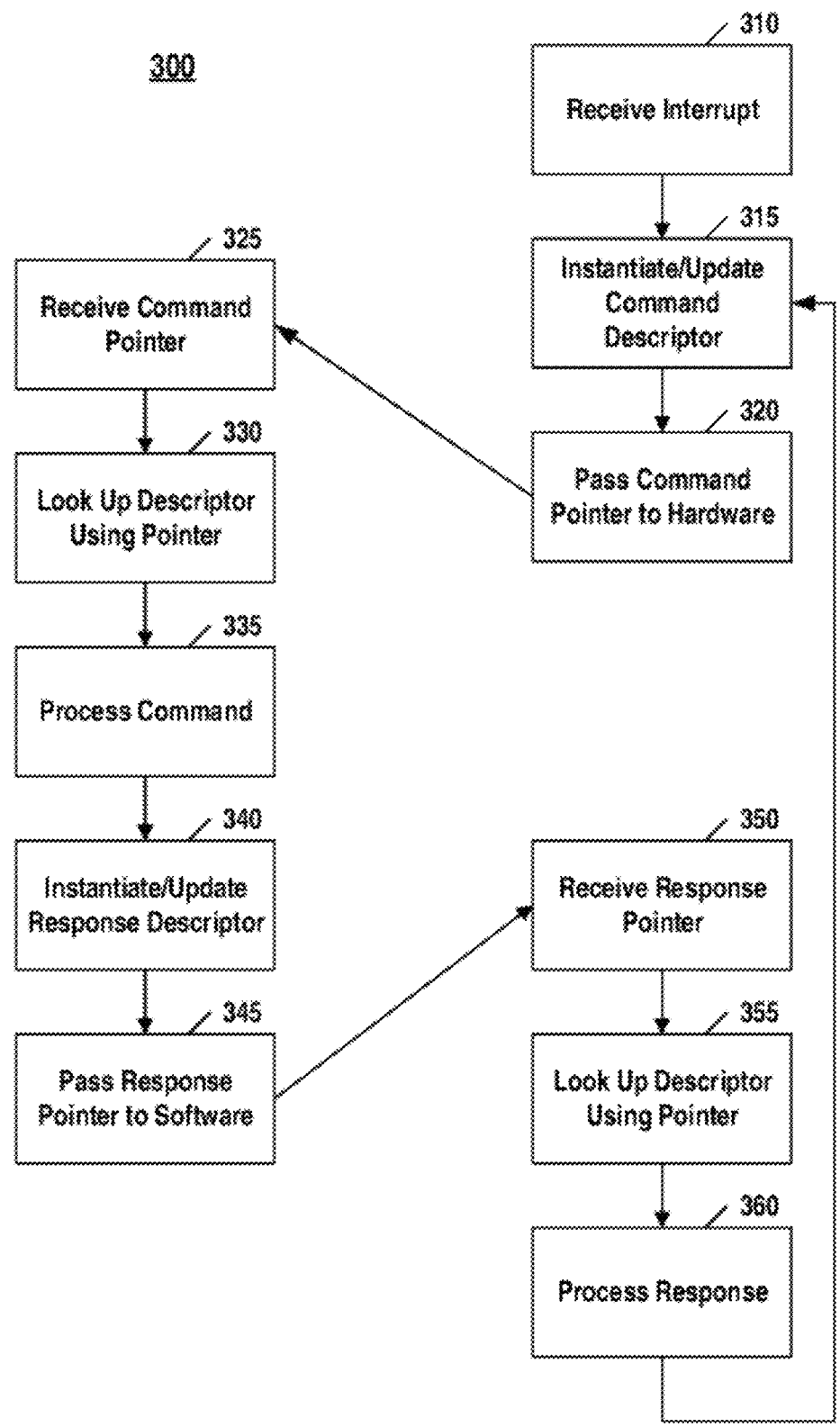
FIG. 3 illustrates a method for descriptor handling according to some embodiments of the present disclosure.
Figure 4:
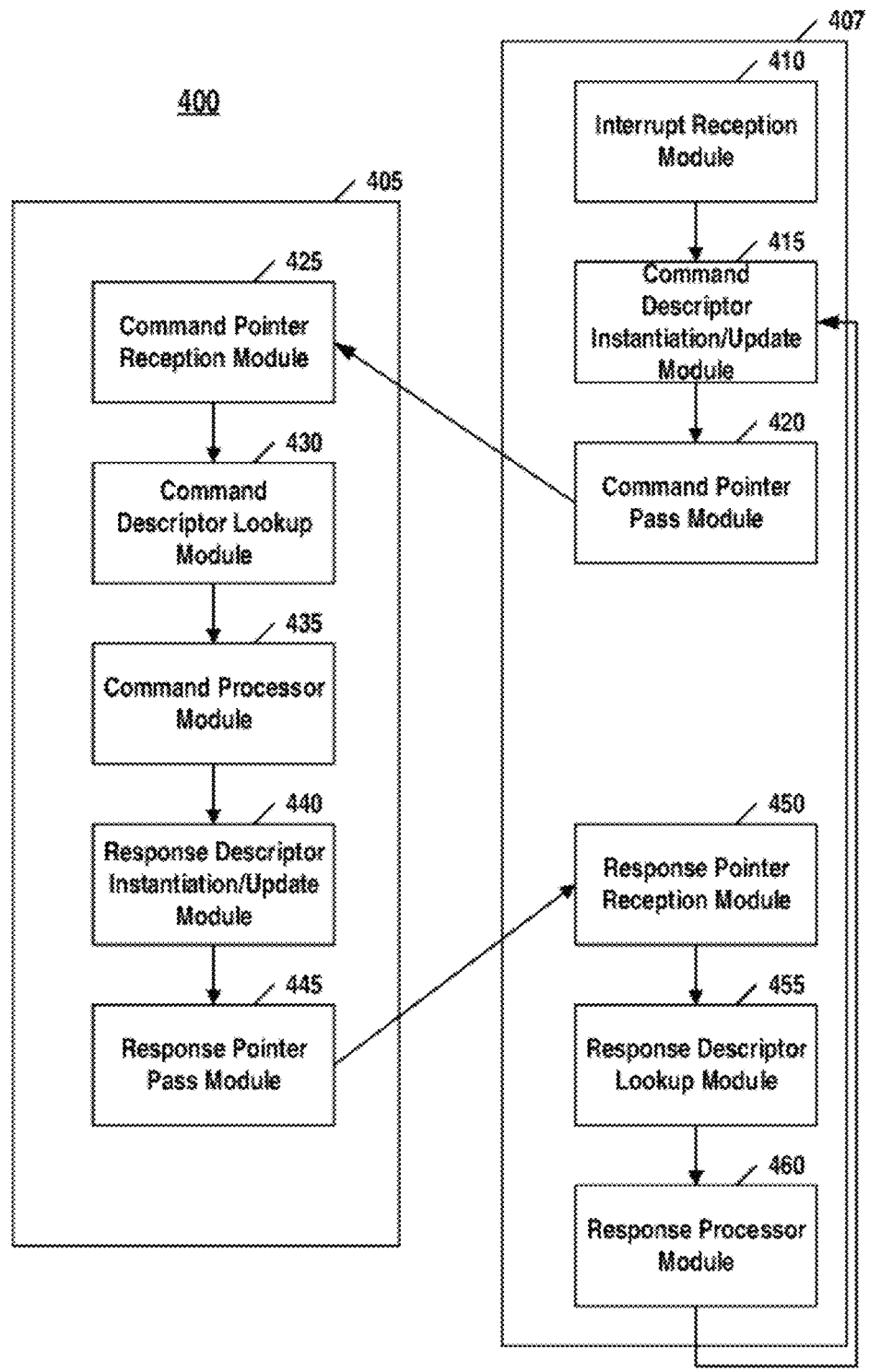
FIG. 4 illustrates a system of functional blocks for descriptor handling according to some embodiments of the present disclosure.

FIG. 3 illustrates a method 300 for descriptor handling according to some embodiments. FIG. 4 illustrates a system 400 for descriptor handling according to some embodiments, which may be configured to perform, for example, the method illustrated in FIG. 3. The steps on the right side of FIG. 3 may be performed by software running on a processor, such as microcontroller 120 in FIG. 1. A microcontroller 407, shown in FIG. 4, may implement the steps on the right side of FIG. 3, using various software modules.

As shown on the right side of FIG. 3, software of a system may receive an interrupt at operation 310. An interrupt reception module 410 can be used to implement operation 310. The reception of the interrupt may be a trigger to issue a command. At operation 315, the software may instantiate and/or update a command descriptor. For example, the first time a packet arrives at the protocol stack, the software may instantiate the descriptor. Subsequently, until the packet leaves the stack, the software may simply update the descriptor. A command descriptor instantiation/update module 415 can be used to implement operation 315.

At operation 320, the software may pass a command pointer to the hardware. The command pointer may be an address in storage 200, where the descriptor (such as, for example, descriptor 205-1) is stored. This passing at operation 320 may be performed by microcontroller 120, placing the address in a queue, where it can be read out by integrated circuits 110 in the same order in which it was placed into the queue. This kind of queueing can be referred to as FIFO. Other queueing can be used. A command pointer pass module 420 can be used to implement operation 320.

The left side of FIG. 3 illustrates operations that may be performed by the hardware of a system, such as integrated circuits 110 in FIG. 1. Integrated circuits 405, shown in FIG. 4, may implement the steps on the left side of FIG. 3, using various modules. As shown in FIG. 3, after operation 320, at operation 325, the system may receive a command pointer. Operation 325 may be implemented by, for example, command pointer reception module 425 in integrated circuits 405. Integrated circuits 405 may be implemented in hardware alone or hardware running software or firmware. For example, integrated circuits 405 may be made up of discrete ASICs that each perform packet processing corresponding to a single layer of the protocol stack.

Referring to FIG. 3, at operation 330, the system can look up the descriptor using the pointer. This operation may be implemented using a command descriptor lookup module 430. Similarly, at operation 335, the system can process the command. A command processor module 435 can implement operation 335.

At operation 340, the system can update the descriptor to serve as a response descriptor. This process can also be considered instantiating a response descriptor. As an alternative, a separate response descriptor could be instantiated, although this may require using additional memory. Operation 340 may be implemented by response descriptor instantiation/update module 440 in FIG. 4.

Referring to FIG. 3, at operation 345, the system can pass a response pointer. The response pointer can be an address, which may be the same address as passed at operation 320. The passing at operation 345 may be performed by integrated circuits 110, placing the address in a queue, where the address can be read out by microcontroller 120. Operation 345 may be implemented by a response pointer pass module 445.

The queue for the response may be different from the queue for the command, as illustrated, for example, in FIG. 1. At operation 350, the system may receive the response pointer, for example, using a response pointer reception module 450. Next, a response descriptor lookup module 455 may look up the response descriptor at operation 355. The looking up of the response descriptor may involve reading from storage 200.

Referring to FIG. 3, at operation 360, the system can process the response using, for example, response processor module 460. The process can then return to, for example, operation 315, as a new command descriptor is generated. For a given packet, the process at a given layer of the stack may end at operation 360, and a subsequent packet may be addressed at the given layer. The next layer of the stack may re-use the same command descriptor. Thus, at operation 315 in a second or subsequent layer, command descriptor instantiation/update module 415 may simply update an already-existing descriptor, such as the descriptor processed at operation 360 by a response processor module 460 in a previous layer. As illustrated in FIG. 1, each layer may have its own dedicated hardware and software.

FIG. 5 illustrates a detailed block diagram of a baseband SoC 502 implementing Layer 2 packet processing using Layer 2 circuits 508 and a microcontroller (MCU) 510 according to some embodiments of the present disclosure. Baseband SoC 502 may be one example of a software and hardware interworking system in which the software functions are implemented by MCU 510, and the hardware functions are implemented by Layer 2 circuits 508. MCU 510 may be one example of microcontroller 120, and Layer 2 circuits 508 may be one example of integrated circuits 110 in FIG. 1. In some embodiments, Layer 2 circuits 508 include an SDAP circuit 520, a PDCP circuit 522, an RLC circuit 524, and a MAC circuit 526. The dedicated integrated circuits (ICs) (for example, SDAP circuit 520, PDCP circuit 522, RLC circuit 524, and MAC circuit 526) controlled by MCU 510 can be used to conduct Layer 2 packet processing. In some embodiments, each of SDAP, PDCP, RLC, and MAC circuits 520, 522, 524, or 526 is an IC dedicated to performing the functions of the respective layer in the Layer 2 user plane and/or control plane. For example, each of SDAP, PDCP, RLC, and MAC circuits 520, 522, 524, or 526 may be an ASIC, which may be customized for a particular use, rather than being intended for general-purpose use. Some ASICs may have high speed, small die size, and low power consumption compared with a generic processor.

As shown in FIG. 5, baseband SoC 502 may be operatively coupled to a host processor 504 and an external memory 506 through a main bus 538. For uplink communication, host processor 504, such as an application processor (AP), may generate raw data that has not been coded and modulated yet by the PHY layer of baseband SoC 502. Similarly, for downlink communication, host processor 504 may receive data after it is initially decoded and demodulated by the PHY layer and subsequently processed by Layer 2 circuits 508. In some embodiments, the raw data is formatted into data packets, according to any suitable protocols, for example, Internet Protocol (IP) data packets. External memory 506 may be shared by host processor 504 and baseband SoC 502, or any other suitable components.

In some embodiments, external memory 506 stores the raw data (e.g., IP data packets) to be processed by Layer 2 circuits 508 of baseband SoC 502 and stores the data processed by Layer 2 circuits 508 (e.g., MAC PDUs) to be accessed by Layer 1 (e.g., the PHY layer). The reverse may be the case in a downlink flow from the user equipment, in which the external memory 506 may store data received from the PHY layer and data output from the Layer 2 circuits 508 after header removal and other tasks. External memory 506 may, or optionally may not, store any intermediate data of Layer 2 circuits 508, for example, PDCP PDUs/RLC SDUs or RLC PDUs/MAC SDUs. For example, Layer 2 circuits 508 may modify the data stored in external memory 506.

As shown in FIG. 5, baseband SoC 502 may also direct memory access (DMA) 516 that can allow some Layer 2 circuits 508 to access external memory 506 directly independent of host processor 504. DMA 516 may include a DMA controller and any other suitable input/output (I/O) circuits. As shown in FIG. 5, baseband SoC 502 may further include a local memory 514, such as an on-chip memory on baseband SoC 502, which is distinguished from external memory 506 that is an off-chip memory not on baseband SoC 502. In some embodiments, local memory 514 includes one or more L1, L2, L3, or L4 caches. Layer 2 circuits 508 may access local memory 514 through main bus 538 as well.

As shown in FIG. 5, baseband SoC 502 may further include a memory 512 that can be shared by (e.g., both accessed by) Layer 2 circuits 508 and MCU 510. It is understood that although memory 512 is shown as an individual memory separate from local memory 514, in some examples, memory 512 and local memory 514 may be local partitions of the same physical memory structure, for example, a static random-access memory (SRAM). In one example, a logical partition in local memory 514 may be dedicated to or dynamically allocated to Layer 2 circuits 508 and MCU 510 for exchanging commands and responses. In some embodiments, memory 512 includes a plurality of command queues 534 for storing a plurality sets of commands, respectively, and a plurality of response queues 536 for storing a plurality sets of responses respectively. Each pair of corresponding command queue 534 and response queue 536 may be dedicated to one of Layer 2 circuits 508. Likewise, command queues 534 may correspond to queues 171, 173, 175 and 177 in FIG. 1, and response queues 536 may correspond to queue 172, 174, 176, and 178.

As shown in FIG. 5, baseband SoC 502 may further include a local bus 540. In some embodiments, MCU 510 may be operatively coupled to memory 512 and main bus 538 through local bus 540. MCU 510 may be configured to generate a plurality sets of control commands and write each set of the commands into respective command queue 534 in memory 512 through local bus 540 and interrupts. MCU 510 may also read a plurality sets of responses (e.g., processing result statuses) from response queues 536 in memory 512, respectively, through local bus 540 and interrupts. In some embodiments, MCU 510 generates a set of commands based on a set of responses from a higher layer in the Layer 2 protocol stack (e.g., the previous stage in Layer 2 uplink data processing) or a lower layer in the Layer 2 protocol stack (e.g., the previous stage in Layer 2 downlink data processing). Through the control commands in commands queues 534 in memory 512, MCU 510 can be operatively coupled to Layer 2 circuits 508 and control the operations of Layer 2 circuits 508 to process the Layer 2 data. It is understood that although one MCU 510 is shown in FIG. 5, the number of MCUs is scalable, such that multiple MCUs may be used in some examples. It is also understood that in some embodiments, memory 512 may be part of MCU 510, e.g., a cache integrated with MCU 510. It is further understood that regardless of the naming, any suitable processing units that can generate control commands to control the operations of Layer 2 circuits 508 and check the responses of Layer 2 circuits 508 may be considered as MCU 510 disclosed herein.

The software and hardware interworking systems disclosed herein, such as system 100 in FIG. 1 and baseband SoC 502 in FIG. 5 may be implemented by any suitable nodes in a wireless network. For example, FIG. 6 illustrates an exemplary wireless network 600, in which some aspects of the present disclosure may be implemented, according to some embodiments of the present disclosure.

Figure 6:
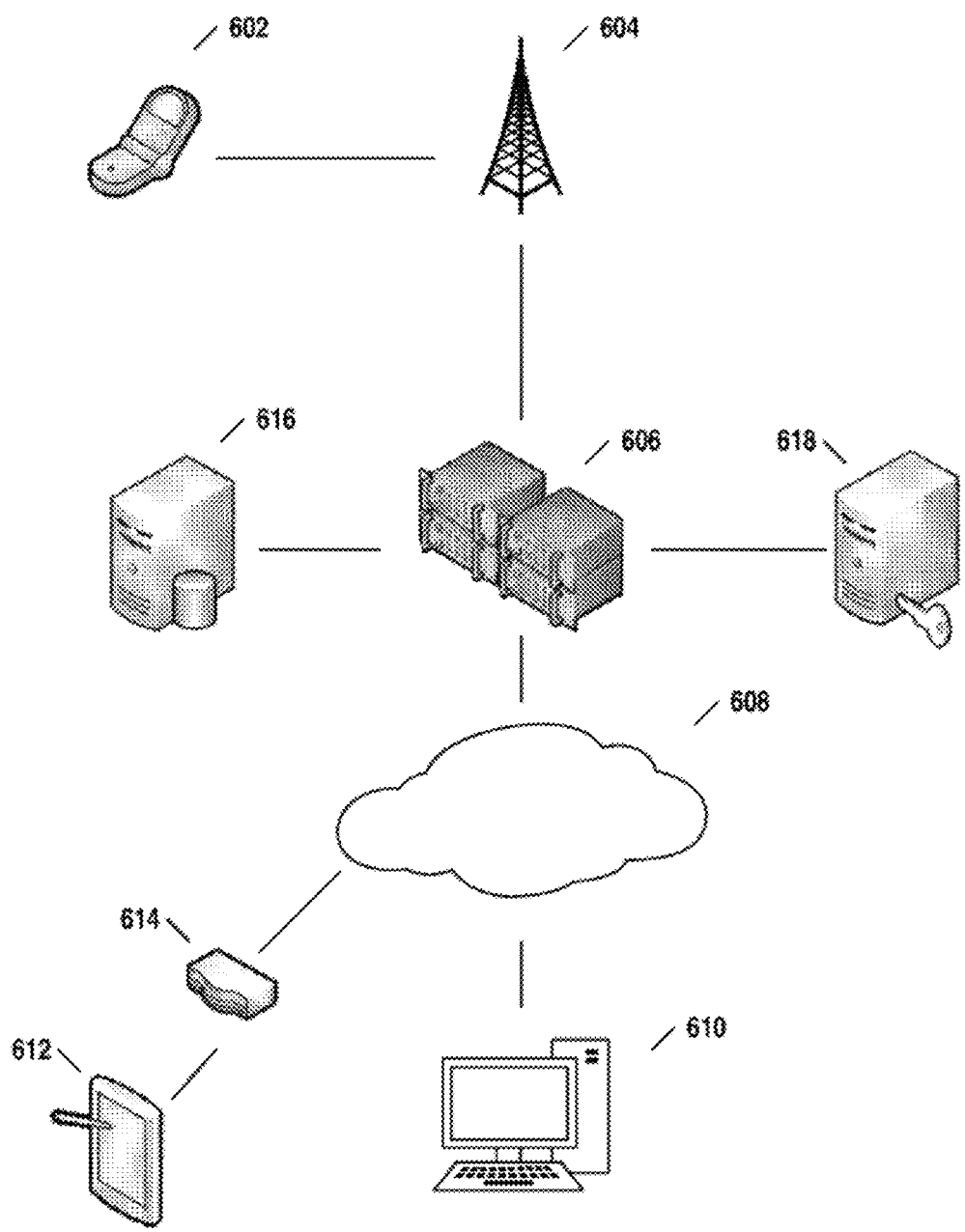
FIG. 6 illustrates an exemplary wireless network that may incorporate descriptor handling, in which some aspects of the present disclosure may be implemented, according to some embodiments of the present disclosure.

As shown in FIG. 6, wireless network 600 may include a network of nodes, such as a user equipment (UE) 602, an access node 604, and a core network element 606. User equipment 602 may be any terminal device, such as a mobile phone, a desktop computer, a laptop computer, a tablet, a vehicle computer, a gaming console, a printer, a positioning device, a wearable electronic device, a smart sensor, or any other device capable of receiving, processing, and transmitting information, such as any member of a vehicle to everything (V2X) network, a cluster network, a smart grid node, or an Internet-of-Things (IoT) node. It is understood that user equipment 602 is illustrated as a mobile phone simply by way of illustration and not by way of limitation.

Access node 604 may be a device that communicates with user equipment 602, such as a wireless access point, a base station (BS), a Node B, an enhanced Node B (eNodeB or eNB), a next-generation NodeB (gNodeB or gNB), a cluster master node, or the like. Access node 604 may have a wired connection to user equipment 602, a wireless connection to user equipment 602, or any combination thereof. Access node 604 may be connected to user equipment 602 by multiple connections, and user equipment 602 may be connected to other access nodes in addition to access node 604. Access node 604 may also be connected to other UEs. It is understood that access node 604 is illustrated by a radio tower by way of illustration and not by way of limitation.

Core network element 606 may serve access node 604 and user equipment 602 to provide core network services. Examples of core network element 606 may include a home subscriber server (HSS), a mobility management entity (MME), a serving gateway (SGW), or a packet data network gateway (PGW). These are examples of core network elements of an evolved packet core (EPC) system, which is a core network for the LTE system. Other core network elements may be used in LTE and in other communication systems. In some embodiments, core network element 606 includes an access and mobility management function (AMF) device, a session management function (SMF) device, or a user plane function (UPF) device, of a core network for the NR system. It is understood that core network element 606 is shown as a set of rack-mounted servers by way of illustration and not by way of limitation.

Core network element 606 may connect with a large network, such as the Internet 608, or another IP network, to communicate packet data over any distance. In this way, data from user equipment 602 may be communicated to other UEs connected to other access points, including, for example, a computer 610 connected to Internet 608, for example, using a wired connection or a wireless connection, or to a tablet 612 wirelessly connected to Internet 608 via a router 614. Thus, computer 610 and tablet 612 provide additional examples of possible UEs, and router 614 provides an example of another possible access node.

A generic example of a rack-mounted server is provided as an illustration of core network element 606. However, there may be multiple elements in the core network including database servers, such as a database 616, and security and authentication servers, such as an authentication server 618. Database 616 may, for example, manage data related to user subscription to network services. A home location register (HLR) is an example of a standardized database of subscriber information for a cellular network. Likewise, authentication server 618 may handle authentication of users, sessions, and so on. In the NR system, an authentication server function (AUSF) device may be the specific entity to perform user equipment authentication. In some embodiments, a single server rack may handle multiple such functions, such that the connections between core network element 606, authentication server 618, and database 616, may be local connections within a single rack.

Although the above-description used uplink and downlink processing of a packet in a user equipment as examples in various discussions, similar techniques may likewise be used for the other direction of processing and for processing in other devices, such as access nodes, and core network nodes. For example, any device that processes packets through a plurality of layers of a protocol stack may benefit some embodiments of the present disclosure, even if not specifically listed above or illustrated in the example network of FIG. 6.

Each of the elements of FIG. 6 may be considered a node of wireless network 600. More detail regarding the possible implementation of a node is provided by way of example in the description of a node 700 in FIG. 7 below. Node 700 may be configured as user equipment 602, access node 604, or core network element 606 in FIG. 6. Similarly, node 700 may also be configured as computer 610, router 614, tablet 612, database 616, or authentication server 618 in FIG. 6.

Figure 7:
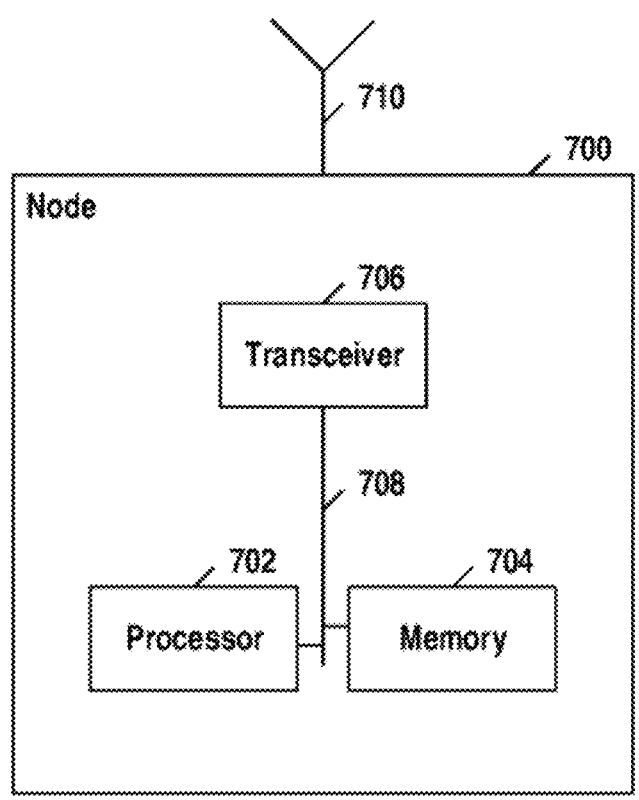
FIG. 7 illustrates a node that may be used for descriptor handling, according to some embodiments of the present disclosure.

As shown in FIG. 7, node 700 may include a processor 702, a memory 704, a transceiver 706. These components are shown as connected to one another by bus 708, but other connection types are also permitted. When node 700 is user equipment 602, additional components may also be included, such as a user interface (UI), sensors, and the like. Similarly, node 700 may be implemented as a blade in a server system when node 700 is configured as core network element 606. Other implementations are also possible.

Transceiver 706 may include any suitable device for sending and/or receiving data. Node 700 may include one or more transceivers, although only one transceiver 706 is shown for simplicity of illustration. An antenna 710 is shown as a possible communication mechanism for node 700. Multiple antennas and/or arrays of antennas may be utilized. Additionally, examples of node 700 may communicate using wired techniques rather than (or in addition to) wireless techniques. For example, access node 604 may communicate wirelessly to user equipment 602 and may communicate by a wired connection (for example, by optical or coaxial cable) to core network element 606. Other communication hardware, such as a network interface card (NIC), may be included as well.

As shown in FIG. 7, node 700 may include processor 702. Although only one processor is shown, it is understood that multiple processors can be included. Processor 702 may include microprocessors, microcontrollers, DSPs, ASICs, field-programmable gate arrays (FPGAs), programmable logic devices (PLDs), state machines, gated logic, discrete hardware circuits, and other suitable hardware configured to perform the various functions described throughout the present disclosure. Processor 702 may be a hardware device having one or many processing cores. Processor 702 may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. Software can include computer instructions written in an interpreted language, a compiled language, or machine code. Other techniques for instructing hardware are also permitted under the broad category of software.

As shown in FIG. 7, node 700 may also include memory 704. Although only one memory is shown, it is understood that multiple memories can be included. Memory 704 can broadly include both memory and storage. For example, memory 704 may include random-access memory (RAM), read-only memory (ROM), SRAM, dynamic RAM (DRAM), ferro-electric RAM (FRAM), electrically erasable programmable ROM (EEPROM), CD-ROM or other optical disk storage, hard disk drive (HDD), such as magnetic disk storage or other magnetic storage devices, Flash drive, solid-state drive (SSD), or any other medium that can be used to carry or store desired program code in the form of instructions that can be accessed and executed by processor 702. Broadly, memory 704 may be embodied by any computer-readable medium, such as a non-transitory computer-readable medium.

In various aspects of the present disclosure, the functions described herein may be implemented in hardware, software, firmware, or any combination thereof. If implemented in software, the functions may be stored on or encoded as instructions or code on a non-transitory computer-readable medium. Computer-readable media includes computer storage media. Storage media may be any available media that can be accessed by a computing device, such as node 700 in FIG. 7. By way of example, and not limitation, such computer-readable media can include RAM, ROM, EEPROM, CD-ROM or other optical disk storage, HDD, such as magnetic disk storage or other magnetic storage devices, Flash drive, SSD, or any other medium that can be used to carry or store desired program code in the form of instructions or data structures and that can be accessed by a processing system, such as a mobile device or a computer. Disk and disc, as used herein, includes CD, laser disc, optical disc, DVD, and floppy disk where disks usually reproduce data magnetically, while discs reproduce data optically with lasers. Combinations of the above should also be included within the scope of computer-readable media.

According to one aspect of the present disclosure, an apparatus for descriptor handling can include a microcontroller and integrated circuits. The microcontroller can be configured to instantiate a command descriptor of a command regarding a packet at a first layer of a protocol stack. The microcontroller can also be configured to pass a command pointer to the command descriptor to the integrated circuits. The integrated circuits can be configured to look up the command descriptor. The integrated circuits can additionally be configured to process the command.

In some embodiments, the first layer may be a MAC layer.

In some embodiments, the microcontroller may be configured to receive an interrupt. Reception of the interrupt may be a trigger for the microcontroller to issue the command.

In some embodiments, the integrated circuits may be configured to instantiate a response descriptor or to update the command descriptor to serve as the response descriptor.

In some embodiments, the integrated circuits may be configured to pass a response pointer to the response descriptor.

In some embodiments, the microcontroller may be configured to receive the response pointer. The microcontroller may also be configured to look up the response descriptor. The microcontroller may further be configured to process the response.

In some embodiments, the command descriptor may include a universal packet descriptor.

In some embodiments, the command descriptor may be configured to be usable by the first layer of the protocol stack and at least one further layer of the protocol stack.

In some embodiments, the command descriptor may be configured to be usable by the first layer of the protocol stack and at least three further layers of the protocol stack.

In some embodiments, the response descriptor may be a universal packet descriptor.

In some embodiments, the response descriptor may be configured to be usable by the first layer of the protocol stack and at least one further layer of the protocol stack.

In some embodiments, the response descriptor may be configured to be usable by the first layer of the protocol stack and at least three further layers of the protocol stack.

In some embodiments, a lifespan of the updated command descriptor may correspond to passage of the packet through all layers of the protocol stack.

In some embodiments, the microcontroller may be configured to instantiate a new command descriptor or update the command descriptor regarding the packet at a second layer of the protocol stack. The microcontroller can also be configured to pass a command pointer to the new command descriptor, or the command pointer to the updated command descriptor, to the integrated circuits.

According to another aspect of the present disclosure, a method for descriptor handling may include instantiating a command descriptor of a command regarding a packet at a first layer of a protocol stack by a microcontroller of a node. The method may also include passing a command pointer to the command descriptor to integrated circuits of the node from the microcontroller of the node. The method may further include looking up, by the integrated circuits, the command descriptor. The method may additionally include processing the command by the integrated circuits.

In some embodiments, the first layer may be a MAC layer.

In some embodiments, the method may further include receiving an interrupt at the microcontroller. The reception of the interrupt may be a trigger for the microcontroller to issue the command.

In some embodiments, the method may further include instantiating a response descriptor by the integrated circuits or updating the command descriptor to serve as the response descriptor.

In some embodiments, the method may further include passing a response pointer to the response descriptor to the microcontroller.

In some embodiments, the method may further include receiving the response pointer. The method may additionally include looking up the response descriptor by the microcontroller. The method may also include processing the response by the microcontroller.

In some embodiments, the command descriptor may be a universal packet descriptor.

In some embodiments, the command descriptor may be configured to be usable by the first layer of the protocol stack and at least one further layer of the protocol stack.

In some embodiments, the command descriptor may be configured to be usable by the first layer of the protocol stack and at least three further layers of the protocol stack.

In some embodiments, the response descriptor may be a universal packet descriptor.

In some embodiments, the response descriptor may be configured to be usable by the first layer of the protocol stack and at least one further layer of the protocol stack.

In some embodiments, the response descriptor may be configured to be usable by the first layer of the protocol stack and at least three further layers of the protocol stack.

In some embodiments, a lifespan of the updated command descriptor corresponds to passage of the packet through all layers of the protocol stack.

In some embodiments, the method may include instantiating a new command descriptor or updating the command descriptor regarding the packet at a second layer of the protocol stack by the microcontroller of the node. The method may include passing a command pointer to the new command descriptor, or the command pointer to the updated command descriptor, to integrated circuits of the node from the microcontroller of the node.

According to a further aspect of the present disclosure, a system for descriptor handling can include a command instantiating/update module configured to instantiate a command descriptor of a command regarding a packet at a first layer of a protocol stack. The system can also include a command pointer passing module configured to pass a command pointer to the command descriptor. The system can further include a command lookup module configured to look up the command descriptor. The system can additionally include a command processing module configured to process the command.

In some embodiments, the first layer may be a MAC layer.

In some embodiments, the system may include an interrupt reception module configured to receive an interrupt. The reception of the interrupt may be a trigger for issuing the command.

In some embodiments, the system may include a response descriptor instantiation/update module configured to instantiate a response descriptor or to update the command descriptor to serve as the response descriptor.

In some embodiments, the system may include a response pointer passing module configured to pass a response pointer to the response descriptor.

In some embodiments, the system may include a response pointer reception module configured to receive the response pointer. The system may also include a response descriptor lookup module configured to look up the response descriptor. The system may further include a response processing module configured to process the response.

In some embodiments, the command descriptor may be a universal packet descriptor.

In some embodiments, the command descriptor may be configured to be usable by the first layer of the protocol stack and at least one further layer of the protocol stack.

In some embodiments, the command descriptor may be configured to be usable by the first layer of the protocol stack and at least three further layers of the protocol stack.

In some embodiments, the response descriptor may be a universal packet descriptor.

In some embodiments, the response descriptor may be configured to be usable by the first layer of the protocol stack and at least one further layer of the protocol stack.

In some embodiments, the response descriptor may be configured to be usable by the first layer of the protocol stack and at least three further layers of the protocol stack.

In some embodiments, a lifespan of the updated command descriptor may correspond to passage of the packet through all layers of the protocol stack.

In some embodiments, the command instantiating/update module may further be configured to instantiate a new command descriptor or update the command descriptor regarding the packet at a second layer of the protocol stack. The command pointer passing module may further be configured to pass the command pointer to the new command descriptor, or the command pointer to the updated command descriptor.

According to yet another aspect of the present disclosure, non-transitory computer-readable medium may encode instructions that, when executed by a microcontroller of a node, perform a process for descriptor handling. The process may include instantiating a command descriptor of a command regarding a packet at a first layer of a protocol stack by the microcontroller. The process may also include passing a command pointer to the command descriptor to integrated circuits of the node from the microcontroller. The command descriptor may be configured to permit looking up, by the integrated circuits, the command. The command descriptor may be configured to additionally permit processing the command by the integrated circuits.

In some embodiments, the first layer may be a MAC layer.

In some embodiments, the process may include receiving an interrupt at the microcontroller. The reception of the interrupt may be a trigger for the microcontroller to issue the command.

In some embodiments, the process may include receiving a response pointer to a response descriptor responsive to the command. The process may also include looking up the response descriptor by the microcontroller. The process may further include processing the response by the microcontroller.

In some embodiments, the command descriptor may be a universal packet descriptor.

In some embodiments, the command descriptor may be configured to be usable by the first layer of the protocol stack and at least one further layer of the protocol stack.

In some embodiments, the command descriptor may be configured to be usable by the first layer of the protocol stack and at least three further layers of the protocol stack.

In some embodiments, the response descriptor may be a universal packet descriptor.

In some embodiments, the response descriptor may be configured to be usable by the first layer of the protocol stack and at least one further layer of the protocol stack.

In some embodiments, the response descriptor may be configured to be usable by the first layer of the protocol stack and at least three further layers of the protocol stack.

In some embodiments, a lifespan of the updated command descriptor may correspond to passage of the packet through all layers of the protocol stack.

In some embodiments, the process may include instantiating a new command descriptor or updating the command descriptor regarding the packet at a second layer of the protocol stack by the microcontroller of the node. The process may also include passing a command pointer to the new command descriptor, or the command pointer to the updated command descriptor, to integrated circuits of the node from the microcontroller of the node.

The foregoing description of the specific embodiments will so reveal the general nature of the present disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

Embodiments of the present disclosure have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The Summary and Abstract sections may set forth one or more but not all exemplary embodiments of the present disclosure as contemplated by the inventor(s), and thus, are not intended to limit the present disclosure and the appended claims in any way.

Various functional blocks, modules, and steps are disclosed above. The particular arrangements provided are illustrative and without limitation. Accordingly, the functional blocks, modules, and steps may be re-ordered or combined in different ways than in the examples provided above. Likewise, some embodiments include only a subset of the functional blocks, modules, and steps, and any such subset is permitted.

The breadth and scope of the present disclosure should not be limited by any of the above-described exemplary embodiments, but should be defined only in accordance with the following claims and their equivalents.

What is claimed is:

1. An apparatus for descriptor handling, comprising:
a microcontroller and integrated circuits;
wherein the microcontroller is configured to:
instantiate a command descriptor of a command regarding a packet at a first layer of a protocol stack, and
pass a command pointer of the command descriptor to the integrated circuits of the apparatus; and
wherein the integrated circuits are configured to:
look up the command descriptor;
process the command;
instantiate a response descriptor or update the command descriptor to serve as the response descriptor; and
pass a response pointer of the response descriptor to the microcontroller.

2. The apparatus of claim 1, wherein the first layer comprises a medium access control (MAC) layer.

3. The apparatus of claim 1, wherein the microcontroller is configured to receive an interrupt, wherein reception of the interrupt is a trigger for the microcontroller to issue the command.

4. The apparatus of claim 1, wherein the microcontroller is further configured to:
receive the response pointer;
look up the response descriptor; and
process the response.

5. The apparatus of claim 1, wherein the response descriptor comprises a universal packet descriptor.

6. The apparatus of claim 1, wherein the response descriptor is configured to be usable by the first layer of the protocol stack and at least one further layer of the protocol stack.

7. The apparatus of claim 1, wherein the response descriptor is configured to be usable by the first layer of the protocol stack and at least three further layers of the protocol stack.

8. The apparatus of claim 1, wherein a lifespan of the updated command descriptor corresponds to passage of the packet through all layers of the protocol stack.

9. The apparatus of claim 1, wherein the microcontroller is further configured to:
instantiate a new command descriptor or update the command descriptor regarding the packet at a second layer of the protocol stack; and
pass a command pointer of the new command descriptor, or the command pointer of the updated command descriptor, to the integrated circuits.

10. The apparatus of claim 1, wherein the command descriptor comprises a universal packet descriptor.

11. The apparatus of claim 1, wherein the command descriptor is configured to be usable by the first layer of the protocol stack and at least one further layer of the protocol stack.

12. The apparatus of claim 1, wherein the command descriptor is configured to be usable by the first layer of the protocol stack and at least three further layers of the protocol stack.

13. A method for descriptor handling, comprising:
instantiating a command descriptor of a command regarding a packet at a first layer of a protocol stack by a microcontroller of a node;
passing a command pointer of the command descriptor to integrated circuits of the node from the microcontroller of the node;
looking up the command descriptor by the integrated circuits;
processing the command by the integrated circuits;
instantiating a response descriptor by the integrated circuits or updating the command descriptor to serve as the response descriptor by the integrated circuits; and
passing a response pointer of the response descriptor to the microcontroller by the integrated circuits.

14. The method of claim 8, wherein the first layer comprises a medium access control (MAC) layer.

15. The method of claim 8, further comprising:
receiving an interrupt at the microcontroller, wherein reception of the interrupt is a trigger for the microcontroller to issue the command.

16. A non-transitory computer-readable medium encoding instructions that, when executed by a node, perform a process for descriptor handling, the process comprising:
instantiating a command descriptor of a command regarding a packet at a first layer of a protocol stack by a microcontroller of the node;
passing a command pointer of the command descriptor to integrated circuits of the node from the microcontroller of the node;
looking up the command descriptor by the integrated circuits;
processing the command by the integrated circuits;
instantiating a response descriptor by the integrated circuits or updating the command descriptor to serve as the response descriptor by the integrated circuits; and
passing a response pointer of the response descriptor to the microcontroller by the integrated circuits.

* * * * *